No. 756,438. PATENTED APR. 5, 1904.
W. L. UHLENHART.
ILLUMINATING BUOY FOR FISHING PURPOSES.
APPLICATION FILED FEB. 26, 1903.
NO MODEL.
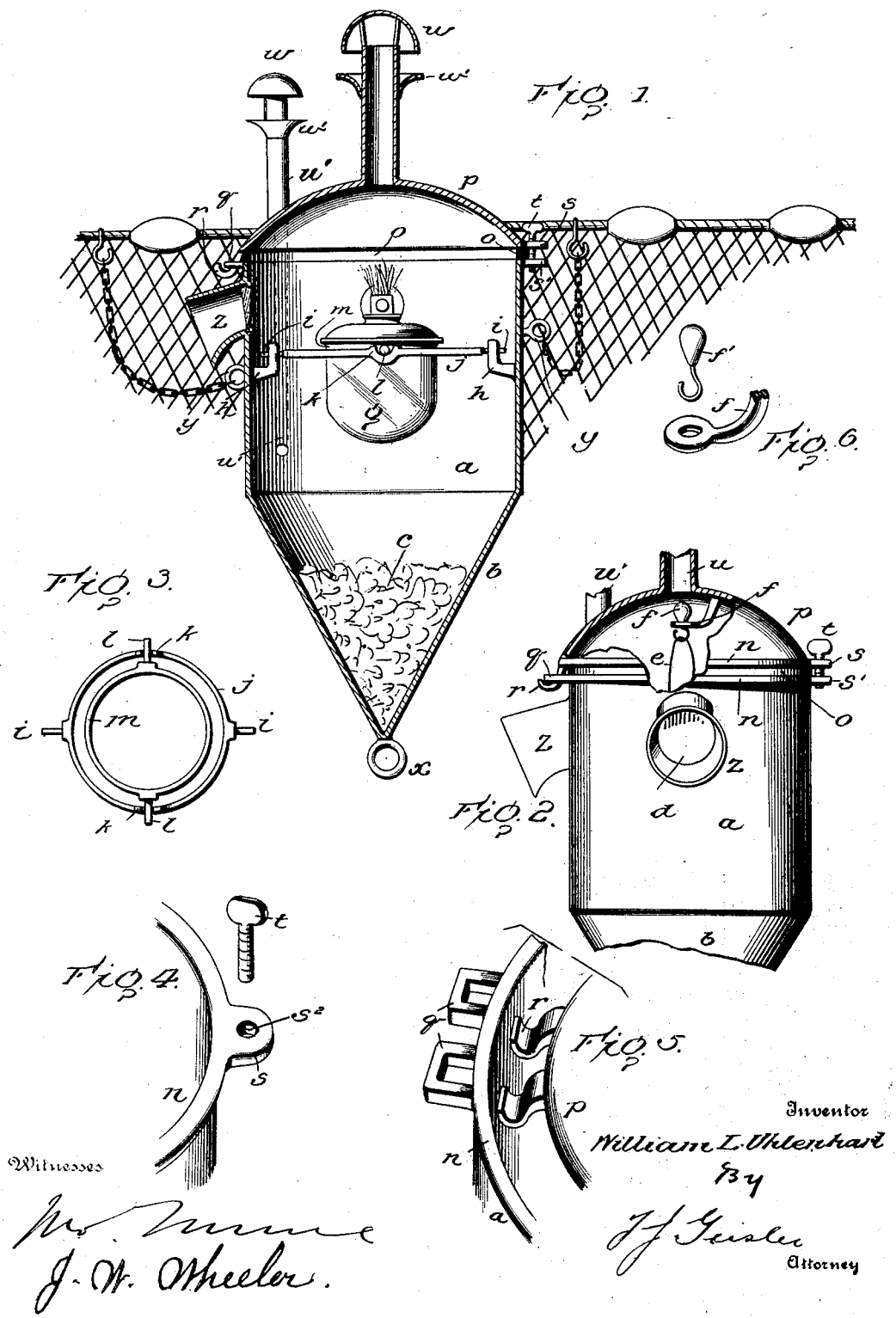

No. 756,438.

Patented April 5, 1904.

UNITED STATES PATENT OFFICE.

WILLIAM L. UHLENHART, OF PORTLAND, OREGON.

ILLUMINATING-BUOY FOR FISHING PURPOSES.

SPECIFICATION forming part of Letters Patent No. 756,438, dated April 5, 1904.

Application filed February 26, 1903. Serial No. 145,238. (No model.)

*To all whom it may concern:*

Be it known that I, WILLIAM L. UHLENHART, a citizen of the United States, and a resident of Portland, in the county of Multnomah and State of Oregon, have invented a new and useful Improvement in Illuminating-Buoys for Fishing Purposes, of which the following is a specification, reference being had to the accompanying drawings as a part thereof.

My invention has for its object to obtain an illuminating-buoy to be attached to the fishing-net or moored in the vicinity of the fishing-trap for the purpose of attracting the fish to the same, and thereby insuring a larger catch, and which buoy shall be particularly adapted for its required service by reason of the following characteristic features: the same to have great stability in rough weather, so as to keep its light as steady as possible; the emitted rays of light of its lamp to be deflected downward at an oblique angle by passing through a prismatic lens, so as to penetrate the depths of the water, and thereby the better to attract the fish swimming by, which is of particular importance in deep-sea fishing, and, besides, to embody the structural features hereinafter described.

My illuminating-buoy is constructed as shown in the drawings, in which—

Figure 1 is a longitudinal vertical section of my buoy, showing the same attached to a gill-net, properly ballasted, and its lamp supported in a marine bracket. Fig. 2 is a partial elevation of my buoy with parts broken away. Fig. 3 is a plan view of a marine or universally-swinging bracket in which the lamp may be supported within the buoy so as to maintain its flame within the focal center of the prismatic lens. Fig. 4 is a detail perspectively showing one of the projecting lugs $s\ s'$ provided with threaded holes on the cover of the body in which to insert a locking-screw $t$ for securing the cover on the body. Fig. 5 is a detail perspective showing the means for removably hinging the cover to the body of the buoy, and Fig. 6 is a detail of the bracket $f$ and the removable hook $f'$ therefrom suspended.

The letters designate the parts referred to.

The body of my buoy consists of a cylindrical portion $a$ and a conical base $b$, the former containing the lamp and the latter the ballast $c$. In the front of the body-casing and also in the two sides are window-openings in which are inserted prismatic lenses $d$, adapted to concentrate and direct the rays of light of the lamp $g$ at an oblique angle, so as to cause the same to penetrate into the depths of the water.

My lamp is supported within the hollow of the buoy-body below the water-surface. If the lamp be an oil-lamp $g$, it must be supported in a universally-swinging bracket, so as to approximately maintain its illuminating-flame in a constant focal center and of course to enable the lamp to burn properly. To this end opposite sides of the buoy-casing are provided with projecting arms $h\ h$, having forked ends in which are inserted the laterally-projecting pins $i\ i$ of the outer ring-bracket $j$, and the latter is provided with sockets $k\ k$ on opposite sides, in which rest the projecting pins $l\ l$ of the inner ring-bracket $m$. An acetylene-lamp constructed in the form of a lantern, or, in fact, any good lantern, may also be conveniently and effectively used. To suspend such lantern from its bail-handle $e$, (see Fig. 2,) I provide a bracket $f$, having a hole in its free end, in which is removably inserted a hook $f'$, provided with a globular head, the details of these devices being illustrated in Fig. 6.

On the exterior of the buoy-body its lens-windows are covered by bell-mouthed hoods $z$, serving to confine the emitted rays of light in the direction described.

The cover $p$ is removably hinged to the top of the body by means of a pair of projecting ears $q$ on the rim of the body and projecting lugs $r$ on the rim of the cover, the latter being inserted into the former. The cover is made removable, so as to facilitate the insertion of ballast; also to insert and trim the lamp. To secure the cover on the body, both are provided with broad flat flanges $n$, having projecting lugs $s\ s'$ in front, provided with threaded holes $s^2$, in which to insert the locking-screw $t$. Two or more sets of lugs like $s\ s'$ may be provided, disposed equidistant about the rims of the body and cover, in which to insert additional locking-screw, if preferred. Between the meeting rims of the body and the cover is placed a rubber gasket o, so as to obtain a water-tight joint.

To supply air to the interior of the buoy, I provide a pipe $u$, entering the cover, and a pipe $u'$, entering the body below the lamp, the pipe $u'$ rising on the exterior of the body, so as not to interfere with the removal and replacing of the cover. To prevent water entering the open ends of the pipes $u$ $u'$, each is provided with a hood $w$ and flaring collar $w'$, the latter operating to fend the water splashing against said air-pipes.

At the base of the body is provided a ring $x$, from which may be suspended additional weight as ballast, if required, or an anchor. On the exterior of the sides are also rings $y$ $y$, to which to attach the chains or ropes securing the buoy to the net or otherwise.

The style of lamp shown is of course merely for illustration. The particular kind of lamp used, whether oil, gas, or electric, is a mere matter of choice and convenience. My buoy should be made of non-corroding material. It may be of any convenient form in cross-section.

The interior of that part of the cylindrical body encompassing the lamp should be finished with a polished reflecting-surface to concentrate the light-rays.

What I claim, and desire to secure by Letters Patent, is—

1. An illuminating-buoy comprising a hollow body; a cover removably secured to the rim thereof; ventilating-pipes entering the interior, means for fending the water splashing against the open ends of such pipes; a lamp, a support therefor; a window-opening in the body below the water-surface, and a lens in such opening adapted to deflect the rays of light into the depths of the water, substantially as described.

2. An illuminating-buoy, comprising a hollow body; a cover removably secured to the rim thereof; ventilating-pipes entering the interior; means for fending the water splashing against the open ends of such pipes; a lamp, a support therefor; a window-opening in the body below the water-surface, a lens in such opening adapted to deflect the rays of light into the depths of the water, and an exterior hood over the lens-window adapted to confine the rays of light, substantially as described.

3. An illuminating-buoy comprising a hollow body, a cover removably secured to the rim thereof, ventilating-pipes $u$, $u'$, hoods covering the open ends of such pipes, projecting collars below such open ends of the pipes for fending the water splashing against the same, a lamp, a support therefor, window-openings on the front and the two sides of the body, below the water-surface, lenses in such openings adapted to deflect the rays of light into the depths of the water, and exterior hoods over the lens-windows, adapted to confine the rays of light, substantially as described.

In witness whereof I have hereunto affixed my signature in the presence of two witnesses.

WILLIAM L. UHLENHART.

Witnesses:
T. J. GEISLER,
MAE LOEB.